UNITED STATES PATENT OFFICE.

JOSEPH KOETSCHET AND MAX THEUMANN, OF LYON, FRANCE, ASSIGNORS TO SOCIÉTÉ CHEMIQUE DES USINES DU RHÔNE (AUCT. GILLIARD, P. MONNET ET CARTIER), OF PARIS, FRANCE, A CORPORATION OF FRANCE.

PROCESS FOR THE PREPARATION OF NEW CELLULOSE ESTERS.

1,191,439.  Specification of Letters Patent.  Patented July 18, 1916.

No Drawing.  Application filed September 5, 1914. Serial No. 860,456.

*To all whom it may concern:*

Be it known that we, JOSEPH KOETSCHET, a citizen of the Republic of Switzerland, and MAX THEUMANN, a citizen of the Republic of France, and residing both at Lyon, Department of Rhône, France (whose post-office addresses are, for the first, 24 Quai Claude-Bernard, Lyon, and, for the second, 5 Place Puvis de Chavannes, Lyon,) have invented a new and useful Process for the Preparation of New Cellulose Esters, of which the following is a specification.

It is known that cellulose can be esterified by means of acetic anhydrid in presence of sulfuric acid, but the degrading action of this body upon the cellulose molecule does not allow very viscous solutions to be obtained except with difficulty. It has been attempted to replace the sulfuric acid by weak acids, or acid or neutral salts, but in presence of these substances the acetylation is very slow.

In the present process there is employed as catalyst methylene sulfate, which can be obtained for example by causing fuming sulfuric acid to react upon trioxymethylene (see *Delepine, Comptes Rendus*, 129, page 831). This body allows a rapid acetylation of the cellulose at low temperature, while yielding remarkably viscous solutions of cellulose acetate in the acetic acid formed.

Example: 100 grams of cotton are brought into contact with a mixture of 610 grams of acetic acid, 50 grams of acetic anhydrid, and 10 grams of methylene sulfate at 30° C.

The reaction is allowed to take place and gradually the cotton forms with the acetic acid a fluid and homogeneous mixture. The product of this first reaction is acetylated by adding 250 grams of acetic anhydrid. The fluid form of the mixture allows the acetylation to be obtained in an easy and regular way. The cotton dissolves gradually and after about one or two hours at 40° C., the acetylation is complete and the solution has become perfectly clear and very viscous. If it is not desired to utilize the product directly as a solution of the acetate, the process is carried a step farther to precipitate the acetate from its solution. This can be accomplished advantageously after the first product is submitted to partial saponification.

The cellulose acetates thus obtained have the property of giving in known solvents very viscous solutions which it is impossible to obtain by means of any of the products already known.

By replacing the acetic anhydrid by formic acid or homologues of acetic anhydrid, other new cellulose esters can be obtained in the same way.

Claims:

1. The process of preparing new esters of cellulose, which consists in esterifying cellulose with an acid anhydrid in the presence of methylene sulfate.

2. The process of preparing new acetic esters of cellulose, which consists in acetylating cellulose with acetic anhydrid in the presence of methylene sulfate.

3. The process of preparing new esters of cellulose, which consists in first treating cellulose with an organic acid and methylene sulfate, and then esterifying the cellulose thus treated by an acid anhydrid.

4. The process of preparing new acetic esters of cellulose, which consists in first treating cellulose with acetic acid and methylene sulfate, and then acetylating the cellulose thus treated by acetic anhydrid.

5. The process of preparing new esters of cellulose, which consists in first treating cellulose with an organic acid in the presence of small quantities of an acid anhydrid and of methylene sulfate, and after reaction esterifying the cellulose by adding the necessary quantities of anhydrid.

6. The process of preparing new acetic esters of cellulose, which consists in first treating cellulose with acetic acid in the presence of small quantities of acetic anhydrid and methylene sulfate, and after reaction acetylating the cellulose by adding the necessary quantities of acetic anhydrid.

7. The process of preparing new acetic esters of cellulose, which consists in first treating cellulose with acetic acid in the presence of small quantities of acetic anhydrid and of methylene sulfate, after reaction acetylating the cellulose by adding the necessary quantities of acetic anhydrid and finally precipitating the acetate of cellulose from its solution.

8. The process of preparing new acetic esters of cellulose, which consists in first treating cellulose with acetic acid in the presence of small quantities of acetic anhydrid and of methylene sulfate, after reaction acetylating the cellulose by adding the necessary quantities of acetic anhydrid, and finally partially saponifying the acetate of cellulose and then precipitating the same from its solution.

9. The process of preparing new esters of cellulose, which consists in treating one hundred parts by weight of cellulose with a mixture of six hundred and ten parts by weight of acetic acid, fifty parts by weight of acetic anhydrid, and ten parts by weight of methylene sulfate having a temperature of 30° C., and then after reaction esterifying the cellulose by adding two hundred and fifty parts by weight of acetic anhydrid.

In testimony whereof we have signed our names to this specification, in the presence of two subscribing witnesses.

JOSEPH KOETSCHET.
MAX THEUMANN.

Witnesses:
JOHN J. ERNSTER,
MARIN VACHON.